(12) United States Patent
Prams et al.

(10) Patent No.: US 8,670,610 B2
(45) Date of Patent: Mar. 11, 2014

(54) METHOD FOR 3D DIGITALIZATION OF AN OBJECT WITH VARIABLE SURFACE

(75) Inventors: Matthias Prams, Rohrdorf (DE); Thomas Mayer, Kolbermoor (DE)

(73) Assignee: Steinbichler Optotechnik GmbH, Neubeuern (DE)

( * ) Notice: Subject to any disclaimer, the term of this patent is extended or adjusted under 35 U.S.C. 154(b) by 319 days.

(21) Appl. No.: 13/213,339

(22) Filed: Aug. 19, 2011

(65) Prior Publication Data
US 2012/0045116 A1 Feb. 23, 2012

(30) Foreign Application Priority Data

Aug. 20, 2010 (DE) .......................... 10 2010 034 987

(51) Int. Cl.
*G06K 9/00* (2006.01)
(52) U.S. Cl.
USPC .......................................................... 382/154
(58) Field of Classification Search
USPC ................................................. 382/154, 100
See application file for complete search history.

(56) References Cited

U.S. PATENT DOCUMENTS 7,576,845 B2 * 8/2009 Asakura et al. ................. 356/73

FOREIGN PATENT DOCUMENTS

EP 2144036 A2 * 1/2010

OTHER PUBLICATIONS

Frey et al, EP 2144036 A2, Jan. 2010, Google Translate, Machine Translation.*

* cited by examiner

*Primary Examiner* — Edward Park
(74) *Attorney, Agent, or Firm* — Dilworth & Barrese, LLP.

(57) ABSTRACT

In a method for the 3D digitalization of an object with variable surface a plurality of camera pictures of partial surfaces of the object (4) are taken and put together for determining the 3D coordinates of the partial surface of the object (4). Camera pictures are taken of partial surfaces of the object (4), which overlap at their edges. For each camera picture the 3D coordinates of the associated partial surface of the object (4) are determined. The 3D coordinates of these partial surfaces of the object (4) are matched and put together by a matching method. Each camera picture is divided into subframes (1.1-1.9, 2.1-2.9, 3.1-3.9) which overlap at their edges and which overlap with the subframes of adjacent camera pictures. To the subframes (1.1-3.9), the associated 3D coordinates from the camera pictures are assigned. The 3D coordinates of the subframes (1.1-3.9) are matched and put together by a matching method. The method can iteratively be carried out several times.

2 Claims, 1 Drawing Sheet

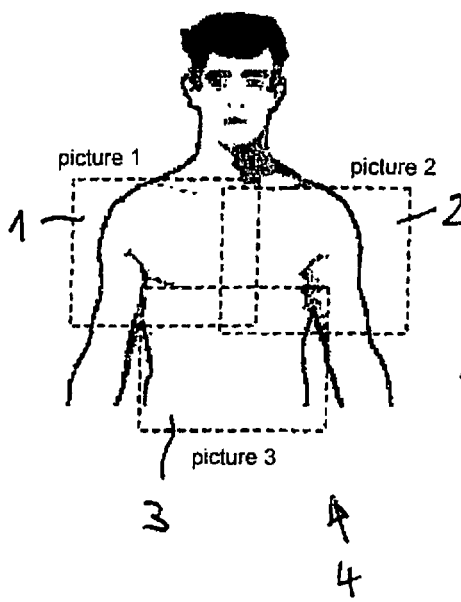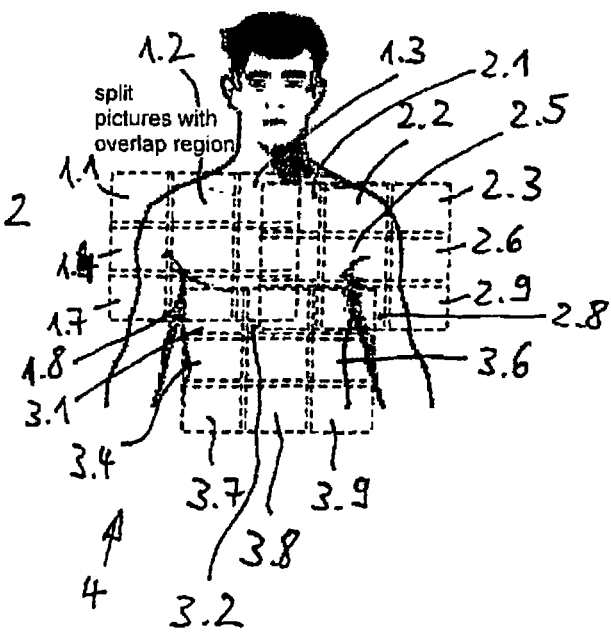

METHOD FOR 3D DIGITALIZATION OF AN OBJECT WITH VARIABLE SURFACE

BACKGROUND OF THE INVENTION

This invention relates to a method for the 3D digitalization of an object with variable surface, in which for determining the 3D coordinates of the surface of the object a plurality of camera pictures of partial surfaces of the object are taken and put together.

A method for the 3D digitalization of an object with a non-variable surface according to the generic part of claim 1 is known from EP 2 144 036 A2. In this method an object with non-variable surface is irradiated with white-light stripes. A camera takes pictures of partial surfaces of the object. The camera can comprise an optical system and a planar sensor, for example a CCD sensor or a CMOS sensor. From the camera pictures, the 3D coordinates of the partial surfaces of the object are determined. The 3D coordinates of the partial surfaces are put together by a matching method.

In EP 2 144 036 various pictures are taken from the object, from which 2D feature points of the object are determined. Subsequently, the 3D coordinates of the 2D feature points are determined. Between the 2D feature points of a picture and the 2D feature points of another picture the 2D point correspondences are determined. A plurality of these 2D point correspondences are selected, and an associated 3D transformation is determined. With reference to the transformed 3D coordinates of the 2D feature points the quality of this 3D transformation is determined, and valid 3D feature points are determined therefrom. For assembling the camera pictures of the object the 3D coordinates of the valid 3D feature points are used.

However, there are also known other matching methods with which the present invention can be carried out, for example the method of the least square errors or other matching methods.

In objects with variable surface, for example in living beings, in particular humans, the problem arises, however, that the camera pictures of the partial surfaces are taken at a time interval from each other, so that the surfaces and partial surfaces can vary between the shots.

SUMMARY OF THE INVENTION

It is the object of the invention to propose a method as indicated above, which is also suitable for the 3D digitalization of an object with variable surface.

In accordance with the invention, this object is solved by the features herein. According to the method, camera pictures are taken of partial surfaces of the object, which overlap at their edges. For each camera picture the 3D coordinates of the associated partial surface of the object are determined. This can be accomplished by the method of white-light projection. It can, however, also be carried out by another method. The 3D coordinates of the partial surfaces of the object are matched and put together by a matching method. For this purpose, the matching method according to EP 2 144 036 A2 or another matching method can be employed. Due to the matching, so-called artifacts can be obtained as a result of changes in the surface between the shots of various camera pictures, which can be visible as steps in the assembled surface of the object.

In accordance with the invention, each camera picture is divided into subframes which overlap at their edges and which overlap with the subframes of adjacent camera pictures. To the subframes, the associated 3D coordinates from the camera pictures are assigned. These are in particular the 3D coordinates which have been determined by the matching method from the 3D coordinates of the partial surfaces of the object. Subsequently, the 3D coordinates of the subframes are matched and put together by a matching method. For this purpose, the matching method according to EP 2 144 036 A2 or another matching method can be employed. All subframes of all camera pictures can be included in the matching method. By matching the subframes the artifacts can be eliminated. In the assembled 3D coordinates of the entire surface no more steps are visible.

Advantageously, the method is carried out several times, preferably iteratively. It can be carried out iteratively, until a satisfactory result has been achieved.

BRIEF DESCRIPTION OF THE DRAWINGS

An exemplary embodiment of the invention will be explained in detail below with reference to the attached drawing, in which:

FIG. 1 shows an object with variable surface, namely the upper body of a man, in a front view, wherein the surface is divided into three partial surfaces, FIG. 2 shows the object as shown in FIG. 1, wherein the camera pictures are divided into subframes.

DESCRIPTION OF THE PREFERRED EMBODIMENTS

The object 4 shown in FIG. 1 comprises three partial surfaces 1, 2, 3 which overlap at their edges. Of each partial surface 1, 2, 3 a camera picture is taken one after the other. This can be done by a sensor (not shown in the drawing) which comprises a camera and a white-light stripe projector. At each shot, the associated partial surface 1, 2, 3 is irradiated with white-light stripes. For each camera picture the 3D coordinates of the associated partial surface 1, 2, 3 of the object 4 are determined.

Subsequently, the 3D coordinates of these partial surfaces 1, 2, 3 of the object 4 are matched and put together by a matching method, for example by the matching method according to EP 2 144 036 A2.

As shown in FIG. 2, each camera picture which belongs to a partial surface 1, 2, 3 is divided into subframes 1.1-1.9, 2.1-2.9 and 3.1-3.9. The subframes 1.1-1.9 are arranged in three lines and three columns. They overlap at their edges. The subframes 2.1-2.9 and 3.1-3.9 also each are arranged in three lines and three columns and each overlap at their edges. Furthermore, the subframes of adjacent camera pictures overlap. For example, the subframes 1.3, 1.6 and 1.9 overlap with the subframes 2.1, 2.4 and 2.7. The subframes 1.8 and 1.9 overlap with the subframes 3.1 and 3.2. The subframes 2.7 and 2.8 overlap with the subframes 3.2 and 3.3.

To the subframes 1.1-1.9, 2.1-2.9, 3.1-3.9 the associated 3D coordinates from the camera pictures of the partial surfaces 1, 2, 3 are assigned. To the subframes 1.1 to 3.9 the matched 3D coordinates from the camera pictures of the partial surfaces 1, 2, 3 are assigned, i.e. the 3D coordinates of those partial surfaces 1, 2, 3 which have been matched and put together by the above-mentioned matching method. Subsequently, these 3D coordinates of the subframes 1.1-1.9, 2.1-2.9, 3.1-3.9 are matched and put together by a matching method. Here as well, the matching method according to EP 2 144 036 A2 or another matching method can again be employed. All subframes 1.1-3.9 are included in the matching method.

The method according to the invention, in particular the matching method over all subframes 1.1-3.9, can be carried out several times. Preferably, this method is carried out iteratively several times, until satisfactory results have been achieved.

The invention claimed is:

1. A method for the 3D digitalization of an object with variable surface, in which for determining the 3D coordinates of the surface of the object (4) a plurality of camera pictures of partial surfaces (1, 2, 3) of the object (4) are taken and put together, camera pictures of partial surfaces (1, 2, 3) of the object (4), which overlap at their edges, are taken, for each camera picture the 3D coordinates of the associated partial surface (1, 2, 3) of the object (4) are determined, the 3D coordinates of these partial surfaces (1, 2, 3) of the object (4) are matched and put together by a matching method, each camera picture is divided into subframes (1.1-1.9, 2.1-2.9, 3.1-3.9) which overlap at their edges and which overlap with the subframes of adjacent camera pictures, to the subframes (1.1-3.9) the associated 3D coordinates from the camera pictures are assigned, and the 3D coordinates of the subframes (1.1-3.9) are matched and put together by a matching method.

2. The method according to claim 1, wherein the method is iteratively carried out several times.

* * * * *